July 8, 1958  E. C. CARLSON ET AL  2,841,944
TRACTOR MOUNTED CORN SHELLER AND PICKER
Filed June 14, 1955  5 Sheets-Sheet 3

Inventors:
Ernest C. Carlson
Samuel E. Hilblom
Peter Sammarco
Paul O. Pippel
Atty.

July 8, 1958  E. C. CARLSON ET AL  2,841,944
TRACTOR MOUNTED CORN SHELLER AND PICKER
Filed June 14, 1955  5 Sheets-Sheet 5

Inventors:
Ernest C. Carlson
Samuel E. Hilblom
Peter Hammarco
Paul O. Pippes
Atty.

2,841,944

TRACTOR MOUNTED CORN SHELLER AND PICKER

Ernest C. Carlson, Wheaton, and Samuel E. Hilblom and Peter Sammarco, Chicago, Ill., assignors to International Harvester Company, a corporation of New Jersey Application June 14, 1955, Serial No. 515,388

2 Claims. (Cl. 56—18)

This invention relates to harvesters and more specifically to corn harvesters of the type which are adapted to be propelled in the field and snap ears of corn off the standing stalks.

In mechanism of the type under consideration, a current practice which is gaining favour not only from the point of view of reducing storage requirements but also eliminating bulk handling of harvested grains, utilizes a series of mechanisms for reducing the corn harvest to its last essential, namely the grain kernels. Specifically, the conventional corn harvesters have been utilized in conjunction with corn shellers which are arranged in trailing relationship to the corn harvesters. The shellers function to remove the grain from the cobs and thus reduce the bulk of the harvested crops. It will be readily appreciated, however, that this type of an arrangement is extremely cumbersome and costly in that usually not only a separate power plant is required for the corn harvester but also for the corn sheller and furthermore the equipment is drawn across the field in tandem which reduces its maneuverability because of its extensive length.

A general object of the invention is to provide a novel and compact combination corn harvester and sheller which is mountable upon the tractor and wherein the various components are arranged in a convenient arrangement for transmitting power and in position where it may be carried on the strongest parts of the tractor.

A further object of the invention is to provide a novel corn sheller attachment for a conventional corn harvester which is adapted to be easily mounted and dismounted with respect to a conventional farm tractor.

A still further object of the invention is to provide a novel combination corn harvester and sheller wherein the shelling assembly is disposed lengthwise transversely of the tractor in rearward overhanging relationship to the rear axle thereof and to minimize the extent of the machinery longitudinally of the tractor.

These and other objects of the invention will become more apparent from the specification and the drawings wherein.

Figure 1:
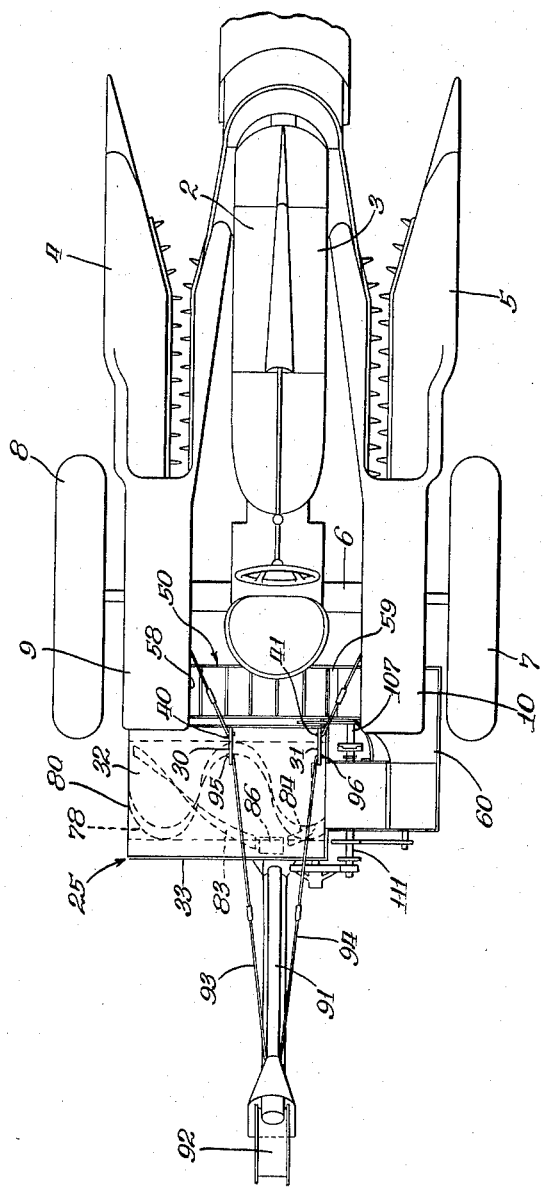
Figure 1 is a plan view of the novel picker and sheller unit shown mounted on a tractor.

Describing the invention in detail, the tractor generally designated 2 (Figure 1) is of conventional tricycle type and comprises an elongated body 3 along opposite sides of which are mounted the corn pickers 4 and 5 which extend rearwardly over the rear axle structure 6 which is disposed transversely of the body 3 at the rear end thereof and carried on right and left wheels 7 and 8.

Figure 3:
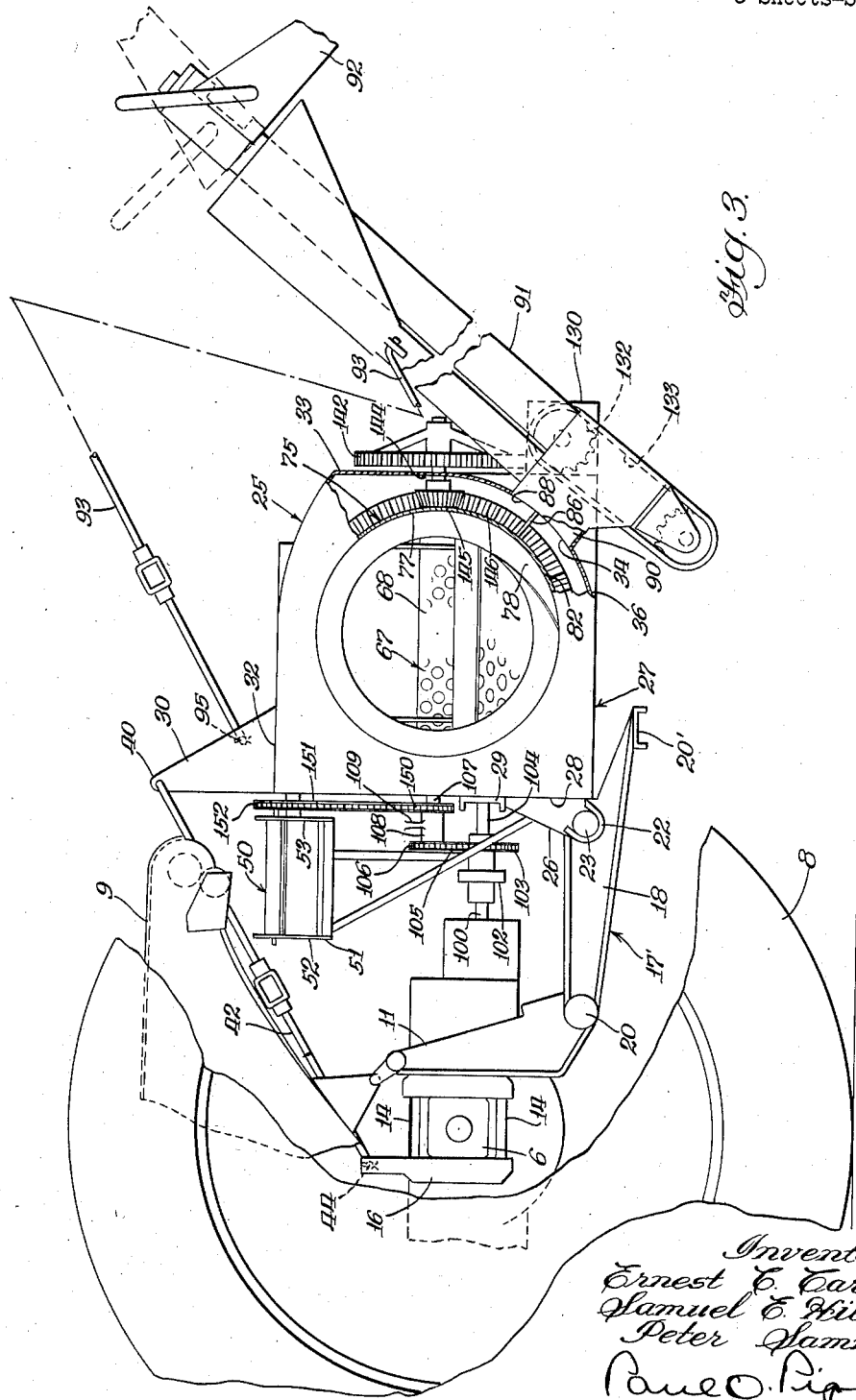
Figure 3 is a side elevational view partially in cross-section of the portion shown in Figure 2.
Figure 4:
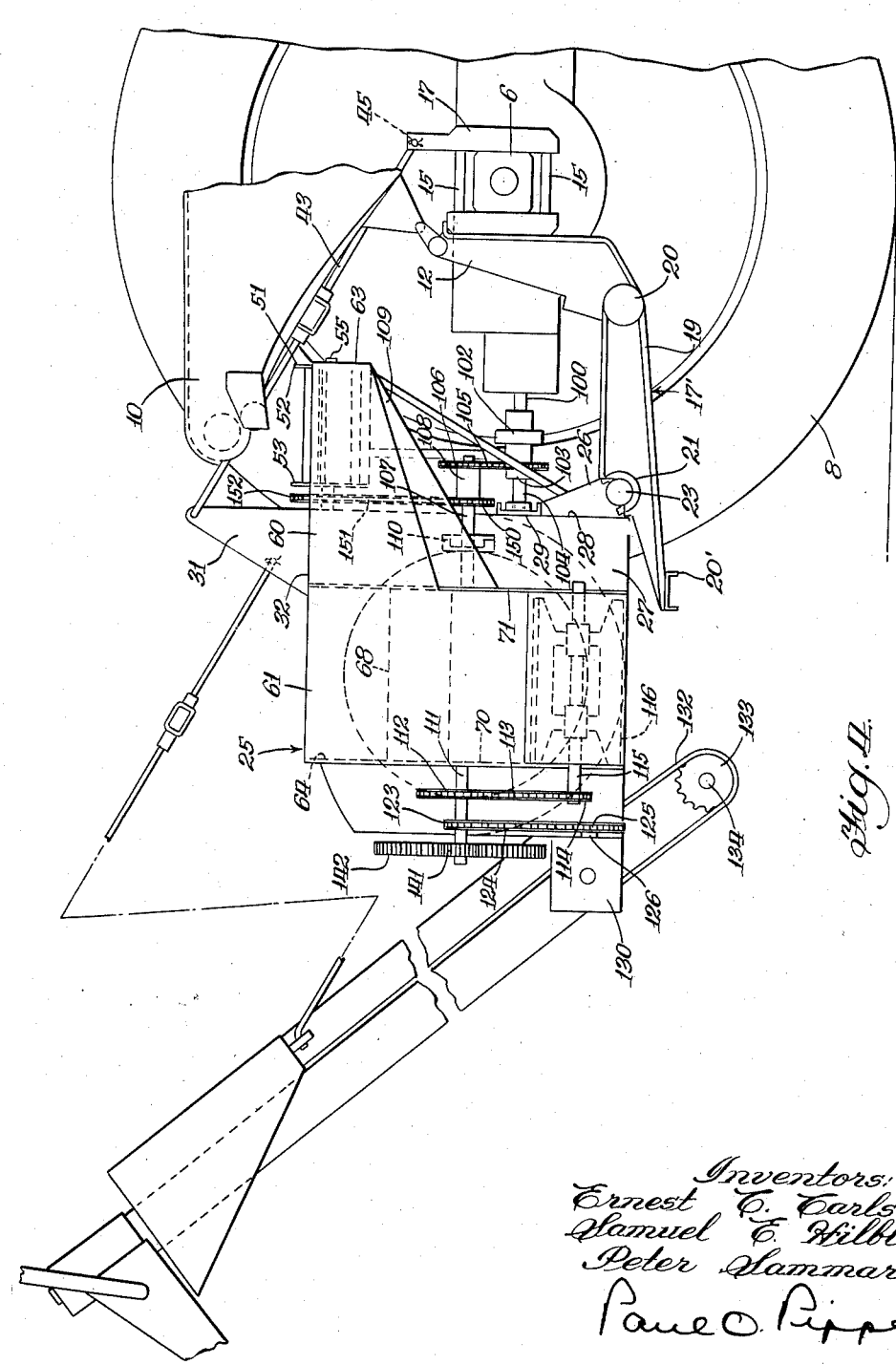
Figure 4 is a further side elevational view of the structure shown in Figure 2 taken from the opposite side thereof.

The rear discharge extremities 9 and 10 of the corn pickers 4 and 5, which house the husking and trash cleaning mechanism, are supported from the rear axle by means of the mountings 11 and 12 (Figures 3 and 4) which are bolted against the back sides of the axle housings by bolts 14 and 15 respectively, the said bolts extending and connected to clamp members 16 and 17 which engage with the forward side of the axle structure.

These support members 11 and 12 extend downwardly from the back side of the axle structure and at their lower extremities support a frame 17' which includes a pair of fore and aft extending beam members 18 and 19 which project rearwardly from the members 11 and 12 and the forward and rear ends of the members 18 and 19 are interconnected by cross beams 20 and 20' which rigidify the construction.

The members 18 and 19 are provided intermediate their ends with U-shaped holders or saddle members 21 and 22 (Figures 3 and 4) which open upwardly and are aligned transversely of the tractor and receive a transverse shaft 23 which is part of and located forwardly of and below the corn shelling and cleaning component or unit or structure generally designated 25.

The shaft 23 is connected to a series of gusset plates 26 which are spaced laterally with respect to the housing 27 of the shelling component 25 and rigidly connected with a front wall or paneling 28 thereof which is rigidified intermediate its upper and lower edges by a generally horizontally extending beam 29 which is integrated with the said forward wall. It will be realized that the shaft 23 is disposed forwardly of the forward side and adjacent to the lower forward corner of the housing 27 and cradles within the sockets 21 and 22. Thereby the housing is readily mountable and removable with respect to the support frame 17 and is at the same time tiltable on a transverse axis fore and aft.

The housing 27 is provided intermediate its ends with a pair of upstanding bracket members 30 and 31 which are integrated with the top wall 32 of the housing, said top wall being connected with the upper edge of the front wall 29 and the upper edge of the back wall 33, and the back wall being curved as at 34 (Figure 3) to provide a curved bottom 36 which projects forwardly from the rear wall 33 and connects with the lower portion of the front wall 28.

The bracket members 30 and 31 are pivotally fastened as at 40 and 41 to the rearward ends of adjustable links or tension rods 42 and 43 which diverge forwardly in straddling relationship to the rear portion of the tractor body and said links being pivotally connected as at 44 and 45 to the clamp members 16 and 17 respectively. It will thus be readily appreciated that the links 42 and 43 maintain the sheller from shifting laterally with respect to the tractor and that the sheller assembly is provided with a cantilever support on the shaft or bar 23.

Figure 2:
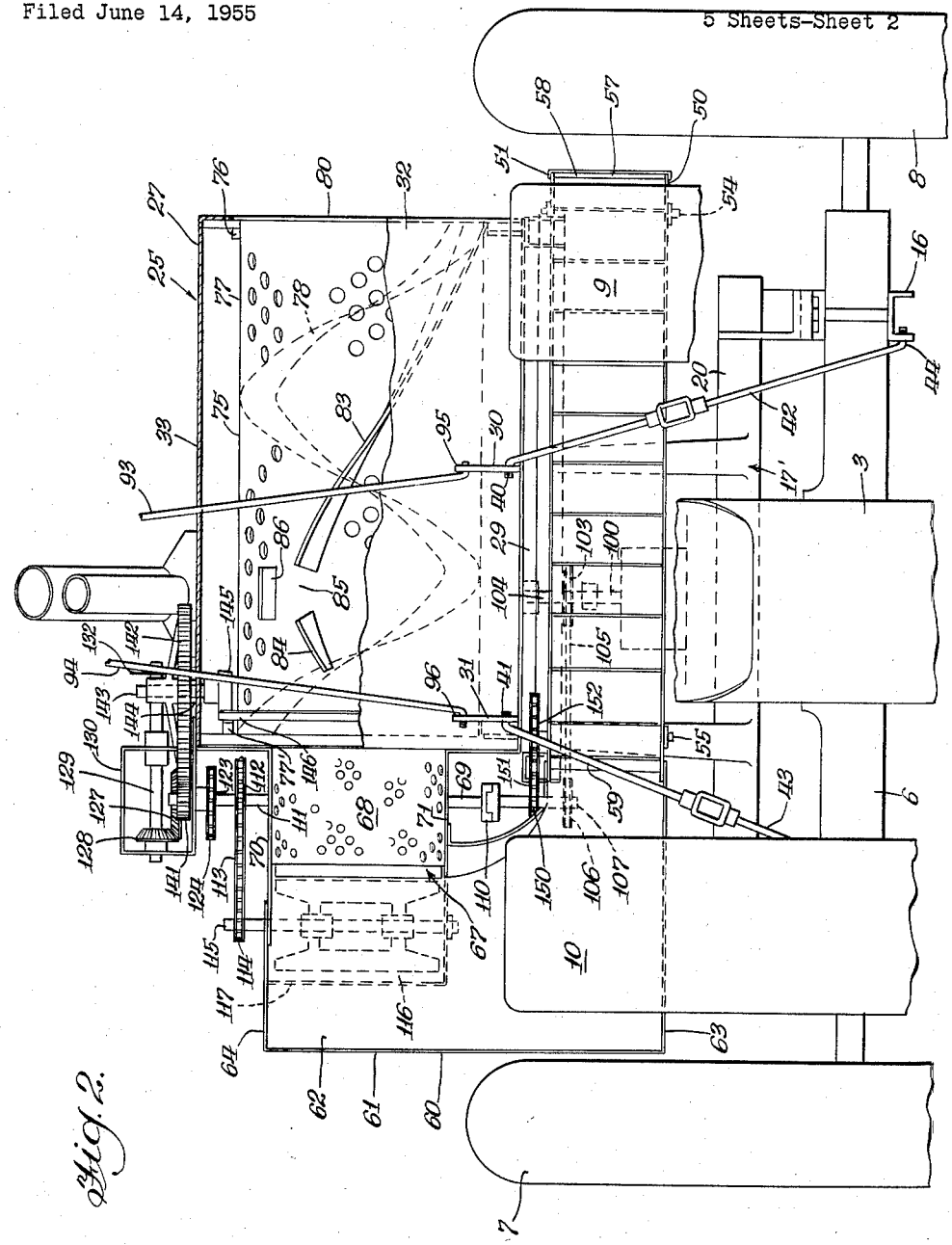
Figure 2 is an enlarged plan view of the rear portion of the tractor and the adjacent mechanism which is partly shown in horizontal section.

The sheller component forwardly of the housing 27 is provided with a transverse conveyor generally indicated 50 which includes a trough-shaped structure 51 elongated transversely of the tractor and having upstanding forward and rear walls 52 and 53 which support a pair of fore and aft extruding, laterally spaced roller assemblies 54 and 55 which carry the endless draper or apron 57, the said conveyor 50 having one end 58, Figure 2, underposed with respect to the discharge extremity of the left hand picker unit housing portion 9 and formed and arranged to transfer the material deposited thereon rightwardly and having a discharge extremity 59 (Figures 1 and 2) disposed adjacent to, but inwardly of, the right hand picker unit portion 10 and discharging into a hopper 60 which is formed as a rightward extension of the housing structure 25 at the cropward end of the structure and comprises a side wall 61, a bottom wall 62, and forward and rear walls 63 and 64.

Figure 5:
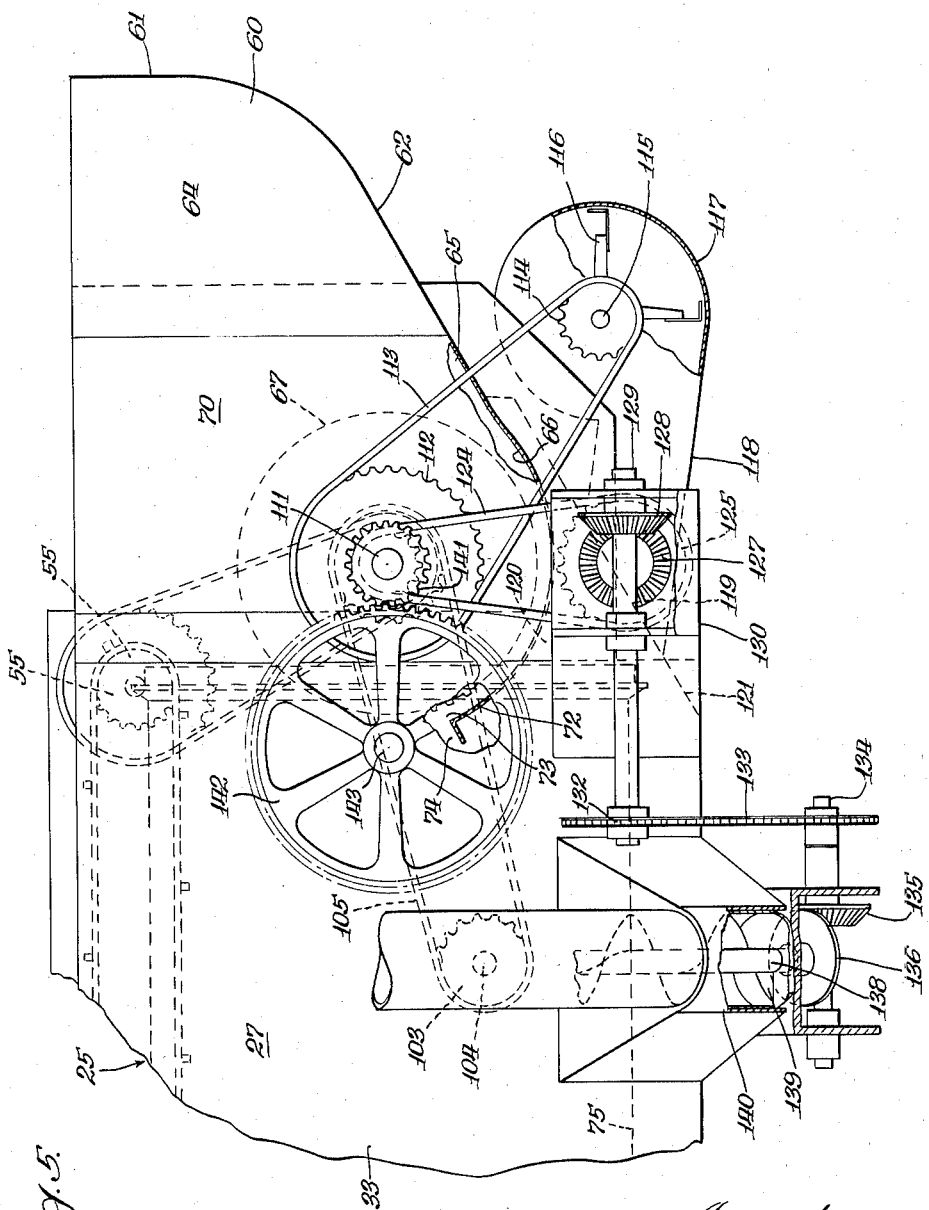
Figure 5 is a fragmentary rear view of the sheller assembly with parts broken away and in section.

The bottom wall 62 slopes downwardly rearwardly and laterally and has a lateral discharge as shown at 65 (Figure 5) into a shelling cylinder compartment 66 which is disposed adjacent to the right end of the housing structure 25 and axially extends in a fore and aft direction and includes the shelling mechanism 67 and includes the drum or rotor 68 which is supported on a fore and aft shaft 69 suitably mounted on the walls 70 and 71 of the shelling cage structure, the wall 70 (Figure 5) being formed as a continuation of the wall 64 and the wall 71 forming the forward margin of the discharge structure 65.

The shelling cylinder cooperates with the shelling concave or cage 72 (Figure 5) and has a discharge 73 into the receiving end 74 of a separating auger type conveyor or conveying and classifying mechanism 75 which extends lengthwise transversely of the tractor within the housing 25 on roller assemblies 76 and 77' (Figure 2) adjacent to opposite ends, the said roller assemblies being suitably carried from the walls of the housing 25. The auger conveyor 75 for conveying and material separating mechanism comprises a tubular or cylindrical perforated drum structure 77 which is provided with an internal auger flight 78 which extends from the inlet end of the drum 77 to the outlet extremity 80 through which are discharged the husks and the cobs as delivered from the end 74 (Figure 5) to the end 80, at the stubbleward side of the harvester, by the auger flight 78 pursuant to rotation of the cylinder 77. It will be understood that the tumbling action attendant to rotation of the drum 77 sifts through the kernels of corn which drop onto the bottom wall 36 of the housing 25, and the external side 82 (Figure 3) of the drum 77 is provided with reversely spiraled auger flights 83 and 84 (Figure 2) which are disposed adjacent to the outlet and inlet ends of the drum and extend at adjacent ends to intermediate portions of the drum 77. These flights 83 and 84 which extend radially outwardly of the drum 75 sweep over the bottom wall 36 and urge the grain to the adjacent ends of the flights 83 and 84 into a passage 85 defined therebetween which is in circumferential alignment with an outwardly extending paddle 86 (Figure 2) on the drum 77 and the paddle 86 functioning to sweep the accumulation of kernels of corn into the discharge opening 88 (Figure 3) which is formed at the juncture of the back and bottom curved portion 34 and discharging into a chute 90 which delivers into a diagonally upwardly and rearwardly extending conveyor 91 which has a discharge chute 92 adjacent to its upper end for delivery to an associated receptacle which is a box of a wagon.

The conveyor 91 is carried at its lower forward end through the chute 90 being connected to the housing 25 and intermediate its ends is fastened to the rear extremities of a pair of forwardly extending tension rods 93 and 94 which at their forward ends are fastened as at 95 and 96, respectively, to the anchor members 30 and 31.

It will be noted that the elevator conveyor 91 is located in direct fore and aft alignment with the tractor body 3 (as best seen in Figure 1) intermediate the lateral extremes of the sheller component which extends lengthwise transversely of the tractor and at its forward portion is confined between the right and left wheels 7 and 8.

The drive for the various parts initiates from the power take-off shaft 100 extending from the rear end of the tractor and connected through a coupling 102 to the sprocket 103 which is carried on a shaft 104 mounted on the beam member 29 at the forward end or side of the housing 25. The sprocket 103 drives a chain 105 which in turn drives a sprocket 106 which is connected to a countershaft 107 (Figure 2) being carried on a bearing 108 from the hanger structure 109 connected to the hopper 60. The shaft 107 is connected at its rear end through a slip clutch coupling 110 (Figure 2) to the shelling cylinder shaft 69 which has a rear extremity 111 extending rearwardly of the wall 70 of the shelling cage and connected to a sprocket 112 which drives a chain 113 which in turn drives a sprocket 114 which is connected to the rear end of a countershaft 115 which constitutes a mounting for a fan 116 disposed beneath the hopper 64 within a fan cage 117 connected to the underside of the bottom wall 62, the hopper and the fan cage providing the duct 118 which communicates through a perforated screen 119 to the space 120 (Figure 5) beneath the shelling cylinder, the screen 119 being disposed in a sloping arrangement with an associated wall 121 which extends to and communicates with the bottom of the housing 25 in order to deliver the grain thereto.

The rear end 111 of the shaft 69 carries a second sprocket 123 which is keyed for rotation therewith and the sprocket 123 drives a chain 124 which drives a sprocket 125 (Figures 4 and 5) on a shaft 126 which projects forwardly from a gear box 130 which is carried from the housing 25, the shaft 126 driving a bevel gear 127 which drives a companion bevel gear 128 which in turn drives a shaft 129 disposed at right angles to the shaft 126 and the shaft 129 extending outwardly of the box and provided with a sprocket 132 which drives a chain 133 which in turn drives a shaft 134 which is carried on the lower end of the conveyor structure 91, the shaft 134 driving a bevel gear 135 which in turn drives a bevel gear 136 (Figure 5) which is fastened and drives a shaft 138 of the auger 139 which constitutes an element of the conveyor 91 and operates within the tube 140.

The rear end 111 of the cylinder shaft 69 is provided with a gear 141 which drives a gear 142 on a countershaft 143 (Figure 3) which is mounted in a bearing 144 on the rear wall 33 of the housing 25, the shaft 143 having a forward end projecting forwardly of the wall 33 and provided with a bevel gear 145 which drives a bevel gear 146 which is fastened to the inner end of the drum 77 and projects outwardly therefrom and it will be understood that the drum 77 is thus driven for rotation on an axis transverse to the direction of travel of the machine.

At the forward end of the shelling cylinder shaft 69 which is connected to the shaft 107 power is transmitted through the shaft 107 to a sprocket 150 (Figure 2) which drives a chain 151 which in turn drives a sprocket 152 which is connected to and drives the shaft of roller assembly 55 which in turn drives the apron 57.

In operation the harvesting units are operated in the normal manner and they discharge either husked or unhusked ears of corn into the hopper 60, the right hand unit discharging directly and the left hand unit discharging through the cross conveyor 50. The hopper gravitationally delivers the corn into the shelling cage 66 and the kernels are removed from the cobs and the cobs and husks with some corn are ejected through the discharge 73 into the inlet end 74 of the auger 75. It will be appreciated that the corn is sifted out of the cobs and the husks which are removed by the shelling mechanism pursuant to rotation of the drum 77 and the blowing action of the fan 116 which tends to agitate the material in the perforated drum and aid in advancing it to the discharge end 80 with the internal auger flight 78. The grain discharges onto the bottom wall 36 and is augered toward the center of the drum by the flights 83 and 84 and pushed by the paddle 86 into the chute or discharge means 90 and from there the grain is augered up to discharge extremity 92 into the trailing wagon. It will be noted that the husks and the cobs are discharged behind the left wheel 8 of the tractor onto the ground.

What is claimed is:

1. For use with a two-row corn picker of the type comprising a pair of pickers mounted at opposite sides of a tractor and which comprises a longitudinal body, a transverse rear axle structure and a pair of large tractor wheels at opposite ends of said structure and said picker units having rear discharge extremities extending over the rear axle structure, the improvement comprising: a sheller and cleaner unit including a housing disposed lengthwise between said wheels rearwardly of said rear axle structure in horizontal transverse alignment therewith, means mounting said unit from said rear axle structure, said unit including a shelling cage adjacent to one end with a rotor journalled therein for rotation about a fore and aft axis, conveying means disposed in receiving relation to said discharge extremities of the pickers and in delivering relation to said cage and positioned ahead of said unit at a common level therewith, combined conveying and classifying mechanism of the sift-through type within said housing disposed substantially perpendicular to the rotor and having a receiving end in receiving relation to said cage and having a discharge end at the end of the housing opposite to said cage for discharging cobs and husks upon the ground and disposed at a common level with said cage in endwise alignment therewith transversely of the tractor, said housing having a bottom wall disposed in receiving relation to said conveying and classifying mechanism for receiving kernels of corn sifted downwardly therefrom, and an elevator conveyor connected to said housing and extending diagonally upwardly and rearwardly therefrom and having a lower end in receiving relation to said classifying mechanism through an opening in said wall of said housing.

2. The invention according to claim 1 and further characterized in that said conveying means comprises an endless belt conveyor mounted on the housing and extending laterally forwardly therefrom and having one end disposed in vertical alignment with said discharge extremity of one of said picker units, and a hopper disposed in receiving relation to the opposite end of said belt conveyor and to said discharge extremity of the other picker unit.

References Cited in the file of this patent

UNITED STATES PATENTS

| | | |
|---|---|---|
| 1,761,346 | Jelbart | June 3, 1930 |
| 1,943,284 | Binau | Jan. 16, 1934 |
| 1,969,016 | Krause | Aug. 7, 1934 |
| 2,299,925 | Paradise et al. | Oct. 27, 1942 |
| 2,380,295 | Crumb et al. | July 10, 1945 |
| 2,577,349 | Mitchell | Dec. 4, 1951 |